(12) United States Patent
Woody et al.

(10) Patent No.: US 7,948,125 B2
(45) Date of Patent: May 24, 2011

(54) SYSTEM AND METHOD FOR COOLING AN ELECTRIC MOTOR

(75) Inventors: George R. Woody, Redondo Beach, CA (US); Brooks S. Mann, Torrance, CA (US); Terence G. Ward, Redondo Beach, CA (US)

(73) Assignee: GM Global Technology Operations LLC, Detroit, MI (US)

( * ) Notice: Subject to any disclaimer, the term of this patent is extended or adjusted under 35 U.S.C. 154(b) by 263 days.

(21) Appl. No.: 12/188,410

(22) Filed: Aug. 8, 2008

(65) Prior Publication Data
US 2010/0033038 A1 Feb. 11, 2010

(51) Int. Cl.
*H02K 9/00* (2006.01)
*H02K 5/10* (2006.01)
(52) U.S. Cl. ............... 310/54; 310/52; 310/55; 310/58; 310/59; 310/86
(58) Field of Classification Search ............. 310/52–59, 310/61, 65, 86, 60 A
See application file for complete search history.

(56) References Cited

U.S. PATENT DOCUMENTS

| | | | |
|---|---|---|---|
| 4,141,669 A | 2/1979 | Darby et al. | |
| 4,499,660 A | 2/1985 | Lenz | |
| 4,647,804 A | 3/1987 | Wefel | |
| 5,019,733 A | 5/1991 | Kano et al. | |
| 5,189,325 A | 2/1993 | Jarczynski | |
| 5,271,248 A | 12/1993 | Crowe | |
| 5,821,653 A * | 10/1998 | Kinto et al. | 310/89 |
| 5,925,947 A | 7/1999 | Kajiwara et al. | |
| 5,994,804 A | 11/1999 | Grennan et al. | |
| 6,459,185 B1 | 10/2002 | Ehrhart et al. | |
| 6,727,609 B2 | 4/2004 | Johnsen | |
| 7,328,125 B2 | 2/2008 | Kawai et al. | |
| 2003/0132673 A1 | 7/2003 | Zhou et al. | |
| 2007/0278869 A1 | 12/2007 | Taketsuna | |

FOREIGN PATENT DOCUMENTS

CN 1918371 A 2/2007
(Continued)

OTHER PUBLICATIONS

Office Action dated Apr. 23, 2003, issued in U.S. Application No. 10/047,878.

(Continued)

*Primary Examiner* — Quyen Leung
*Assistant Examiner* — Jose A Gonzalez Quinones
(74) *Attorney, Agent, or Firm* — Ingrassia Fisher & Lorenz, P.C.

(57) ABSTRACT

A cooling system is provided for an electric motor and comprises a rotor assembly, an intake assembly, and a first reservoir. The rotor assembly is coupled to and rotatable within a housing, and comprises a rotor having a first and second ends having a first plurality of veins extending therebetween, each vein having an inlet and an outlet. The rotor assembly also comprises a first manifold coupled to and rotatable with the first end of the rotor in fluid communication with the inlets of the first plurality of veins. The intake assembly is coupled to the housing and is in fluid communication with the first manifold. The first reservoir is configured to contain a motor coolant and is coupled to the housing for collecting the motor coolant from the outlets of the first plurality of veins, and for providing a source of motor coolant to the intake assembly.

20 Claims, 5 Drawing Sheets

FOREIGN PATENT DOCUMENTS

| | | |
|---|---|---|
| CN | 101107767 A | 1/2008 |
| DE | 1050889 | 2/1959 |
| JP | 09154258 | 6/1997 |
| WO | WO 2005080765 A1 * | 9/2005 |

OTHER PUBLICATIONS

Response to Office Action dated Jul. 16, 2003, filed in U.S. Appl. No. 10/047,878.
Final Office Action dated Oct. 17, 2003, issued in U.S. Appl. No. 10/047,878.
Response to Office Action dated 2112/2004, filed in U.S. Appl. No. 10/047,878.
Advisory Action dated Mar. 7, 2004, issued in U.S. Appl. No. 10/047,878.
RCE dated Mar. 24, 2004, filed in U.S. Appl. No. 10/047,878.
Office Action dated May 25, 2004, issued in U.S. Appl. No. 10/047,878.
Response to Office Action dated Sep. 16, 2004, filed in U.S. Appl. No. 10/047,878.
Final Office Action dated Nov. 30, 2004, issued in U.S. Appl. No. 10/047,878.
Response to Office Action dated Feb. 25, 2005, filed in U.S. Appl. No. 10/047,878.
Advisory Action dated Mar. 14, 2005, issued in U.S. Appl. No. 10/047,878.
Notice of Appeal dated Jul. 13, 2005, filed in U.S. Appl. No. 10/047,878.
Notice of Abandonment dated Jul. 22, 2005, issued in U.S. Appl. No. 10/047,878.
Petition to Revive Unintentionally Abandoned Application dated Sep. 9, 2005, filed in U.S. Appl. No. 10/047,878.
Notice of Appeal dated Sep. 9, 2005, filed in U.S. Appl. No. 10/047,878.
Petition Decision—Granted dated Dec. 27, 2005, issued in U.S. Appl. No. 10/047,878.
Appeal Brief dated Feb. 27, 2006, filed in U.S. Appl. No. 10/047,878.
Examiner's Answer dated Aug. 6, 2006, issued in U.S. Appl. No. 10/047,878.
BPAI Decision dated Apr. 28, 2008, issued in U.S. Appl. No. 10/047,878.
Notice of Abandonment dated Aug. 7, 2008, issued in U.S. Appl. No. 10/047,878.
Chinese Office Action for Chinese Application No. 200910165734.4 mailed Feb. 14, 2011.

* cited by examiner

US 7,948,125 B2

SYSTEM AND METHOD FOR COOLING AN ELECTRIC MOTOR

TECHNICAL FIELD

The present invention generally relates to electric motors, and more particularly relates to a system and method for cooling the internal components of an electric motor of the type used in an electric or hybrid vehicle.

BACKGROUND OF THE INVENTION

Electric motors for vehicular applications must meet stringent performance requirements while conforming to size and weight limitations to maintain their suitability for automotive use. Often design criteria conflict when strengthening one type of performance creates a deficiency in another equally important. For example, electric motors used for drive wheels in hybrid cars must be compact and light weight, yet powerful enough to quickly accelerate a car to a speed at which the internal combustion (IC) engine can take over. In addition, they must be efficient enough to provide a convenient driving range that consumers find acceptable and that is competitive with that of purely IC vehicles. Finally, to be truly cost effective to their owners, automotive electric motors must demonstrate durability and reliability by offering suitable performance while operating amid extremes in ambient temperatures.

Electric motors used in automotive applications may be susceptible to heat build-up because of the need for a high output from a compact and light weight unit. Furthermore, the interior of heat generating components of a motor, such as the rotor, are not usually actively cooled. Instead, internally generated heat is typically conducted through several thermal barriers including air gaps before reaching cooling jackets located at the outer periphery of a motor's housing. As a result, many key components reach high temperatures during normal operation which may accelerate wear of moving parts such as shafts, bearings, and rotors.

Accordingly, it is desirable to provide a system for improving heat dissipation in electric motors that will increase their reliability and lifespan, while lowering their overall cost of operation. In addition, it is desirable to reduce the internal operating temperature of vehicular electric motors to improve their efficiency, power output, and performance. Further, other desirable features and characteristics of the present invention will become apparent from the subsequent detailed description and the appended claims, taken in conjunction with the accompanying drawings and the foregoing technical field and background.

SUMMARY OF THE INVENTION

In accordance with an embodiment, by way of example only, a system for providing a motor coolant to an electric motor having a housing is provided, wherein the system comprises a rotor assembly, an intake assembly, and a first reservoir. The rotor assembly is coupled to and rotatable within the housing, and comprises a rotor having a first end and a second end and having a first plurality of veins extending therebetween, each vein having an inlet and an outlet. The rotor assembly also comprises a first manifold coupled to and rotatable with the first end of the rotor in fluid communication with the inlets of the first plurality of veins. The intake assembly is coupled to the housing and is in fluid communication with the first manifold. The first reservoir is configured to contain a motor coolant and is coupled to the housing for collecting the motor coolant from the outlets of the first plurality of veins, and for providing a source of motor coolant to the intake assembly.

A method for providing coolant to an electric motor in accordance with an exemplary embodiment of the present invention is provided. The electric motor includes a rotor having a plurality of veins extending therethrough with each vein having an inlet and an outlet. The method comprises pumping the coolant through the plurality of veins, collecting the coolant exiting from the outlets of the plurality of veins in a fluid reservoir, and removing heat from the coolant.

DESCRIPTION OF THE DRAWINGS

The present invention will hereinafter be described in conjunction with the following drawing figures, wherein like numerals denote like elements.

DESCRIPTION OF AN EXEMPLARY EMBODIMENT

The following detailed description is merely exemplary in nature and is not intended to limit the invention or the application and uses of the invention. Furthermore, there is no intention to be bound by any expressed or implied theory presented in the preceding technical field, background, brief summary, or the following detailed description.

Figure 1:
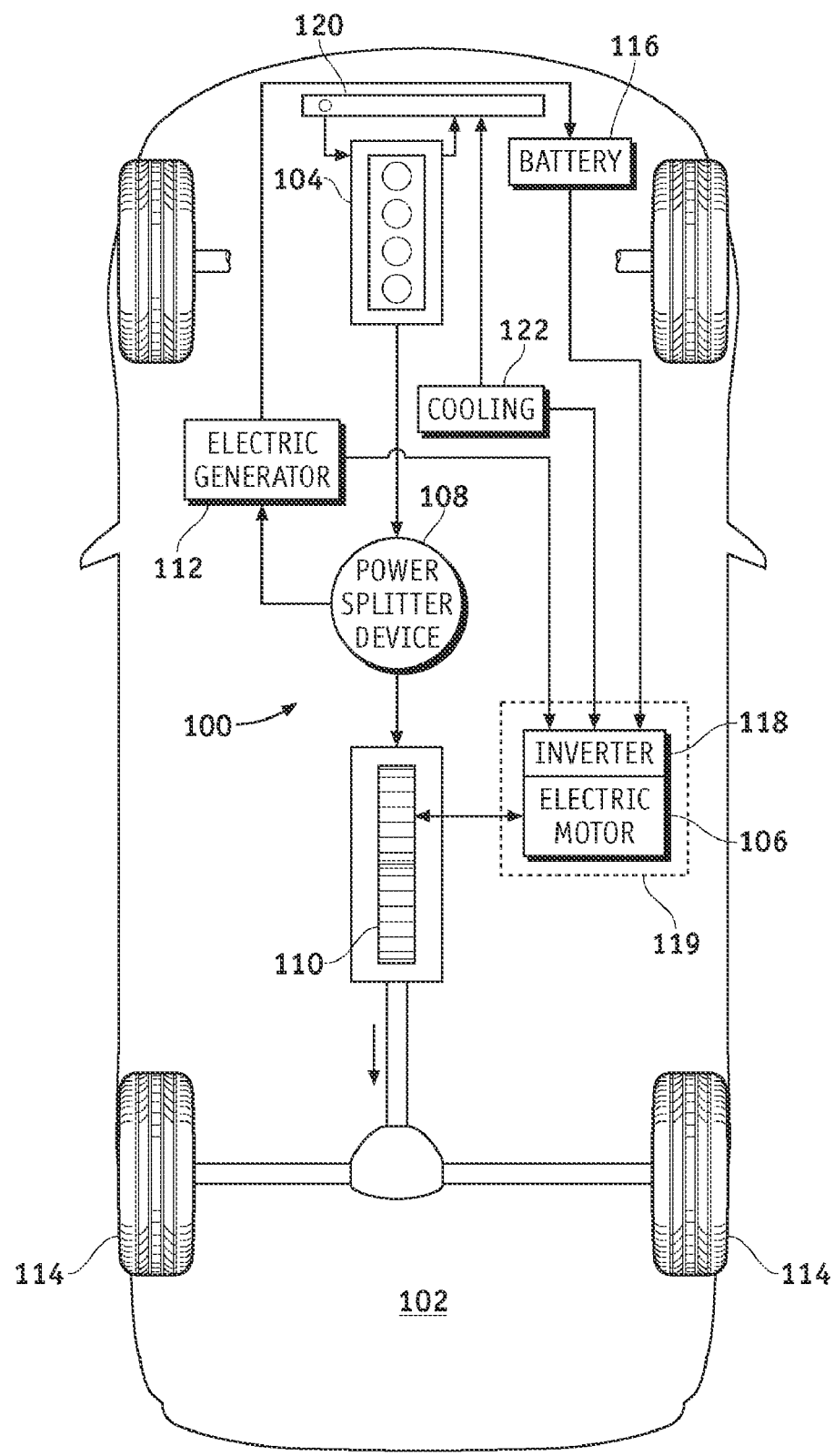
FIG. 1 is a schematic diagram of an exemplary hybrid gas-electric drive vehicle.

FIG. 1 is a schematic diagram of a gas-electric hybrid drive 100 implementation on a vehicle 102. In a first embodiment, the gas-electric drive 100 may include an internal combustion engine 104 and an electric motor 106. The internal combustion engine 104 generates power and is in operative communication with a power splitter device 108 that divides the power generated between a transmission 110 and an electric generator 112. As shown in FIG. 1, the transmission 110 may be coupled to drive wheels 114 of the vehicle 102. The electric generator 112 generates power, a portion of which may be used to charge a battery 116. The battery 116 may supply current to an inverter 118, which in turn, supplies power to the electric traction motor 106. In an embodiment, the inverter 118 and the electric motor 106 may be an integral component and thus, may be a single module (e.g., integrated electric motor-inverter 119). Alternatively, the electric motor 106 may receive power directly from the electric generator 112.

After a period of operation, the temperature of the internal combustion engine 104 and/or the electric motor 106 may increase. To maintain their temperatures within an acceptable range (e.g., ±10 degrees), a first heat exchanger 120 thermally coupled to internal combustion engine 104 and configured to dissipate heat to the atmosphere may be added. Further, an electric motor cooling system 122 configured to provide cooling to electric motor 106 and thermally coupled to first heat exchanger 120 may also be included. Heat generated within internal combustion engine 104 may be transferred to a vehicle coolant circulating therethrough, and transported to first heat exchanger 120 to be dissipated therein to the atmosphere. Similarly, electric motor cooling system 122 may absorb heat generated by electric motor 106, and may transport a portion of this heat to first heat exchanger 120 for atmospheric dissipation via its thermal coupling thereto.

Figure 2:
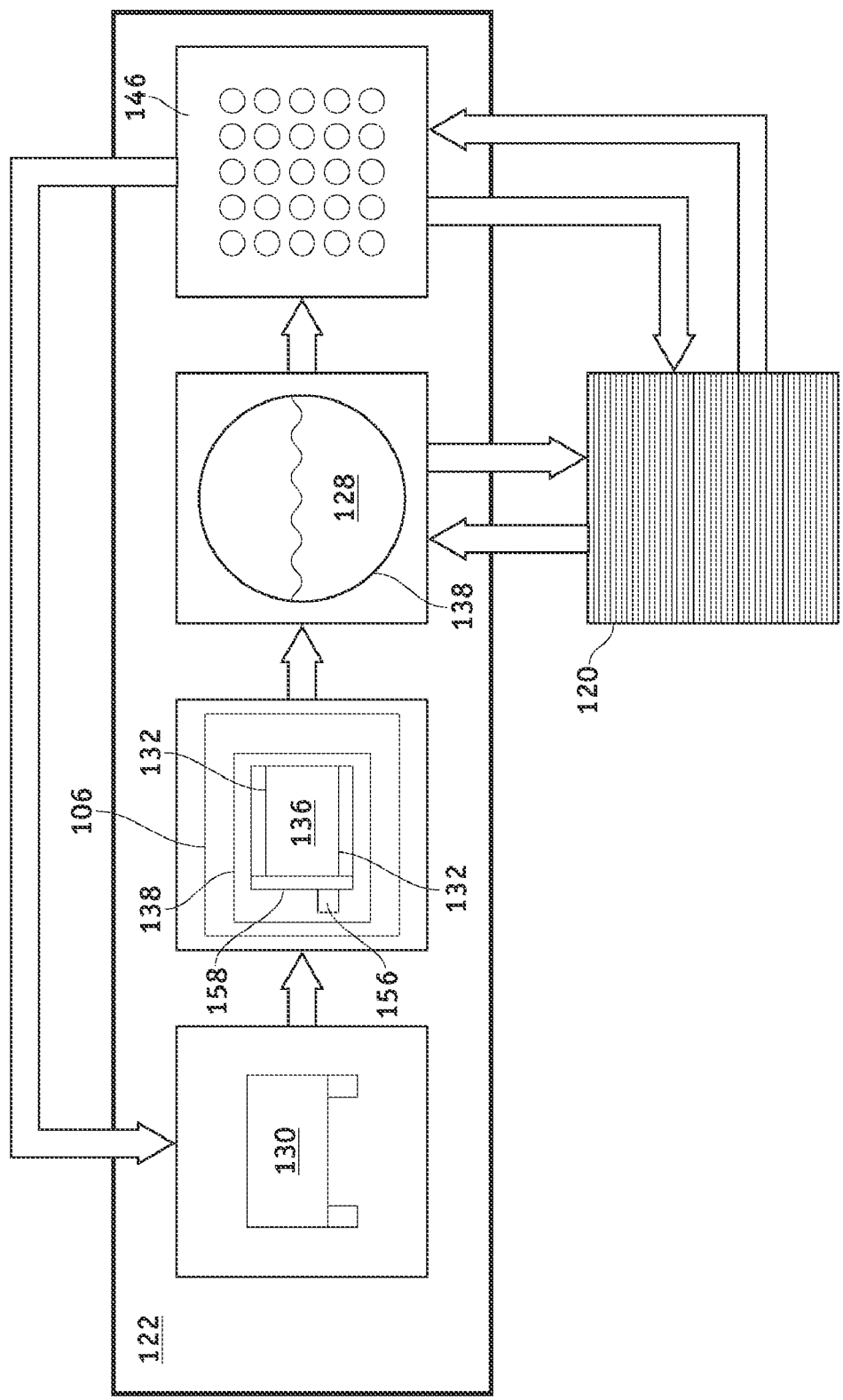
FIG. 2 is a schematic diagram of an exemplary electric motor cooling system.

FIG. 2 is a schematic diagram illustrating certain components of electric motor cooling system 122 and their interaction with first heat exchanger 120. As will be discussed in greater detail below, collectively these components comprise a closed loop flow system configured to provide cooling to motor 106 by circulating a motor coolant therein to absorb heat generated. Cooling system 122 may dissipate this heat to the atmosphere directly, or by transferring heat to first heat exchanger 120, or by a combination of these two. The components include a pump 130 in fluid communication at its inlet with a second heat exchanger 146, and at its outlet with a first intake assembly 156. The first intake assembly 156 is coupled to a housing 138 of motor 106, and is in fluid communication with pump 130 and the inlet to first manifold 158. First manifold 158 is coupled to and rotates with a rotor 136 of motor 106, and is in fluid communication with first intake assembly 156 at its inlet, and with rotor 136 at its outlet.

Those having skill in the art will appreciate that the term "rotor" as used in this description may refer to the combination of a rotor and a balancer, or conversely, merely to a rotor alone. The addition of a balancer to a rotor is in no way integral to the invention embodied herein, and therefore may be considered as an extension of the rotor.

Rotor 136 may rotate freely within housing 138, and has a first and second end with a first plurality of cooling veins 132 extending therebetween. Each of the cooling veins 132 has an inlet in fluid communication with first manifold 158, and an outlet which may drain to a reservoir 128. The reservoir 128 may be disposed within housing 138, and receives an inflow of motor coolant drainage from cooling veins 132, (and other internal components onto which motor coolant is splashed during operation) and is in flow communication at its outlet with second heat exchanger 146. The second heat exchanger 146 receives an input stream from reservoir 128, and is in flow communication at its outlet with pump 130. Pump 130 may be disposed within the housing 138 of motor 106, or it may be disposed remotely. In either case, pump 130 may be brought into fluid communication with cooling system 122 using appropriate feed lines. In an embodiment, pump 130 is a sump pump disposed adjacent to the bottom of the housing 138.

During system operation, pump 130 forces motor coolant through first intake assembly 156 and into first manifold 158 wherein it is partitioned and channeled into the inlets of each of the first plurality of cooling veins 132. Motor coolant absorbs heat from rotor 136 while flowing through veins 132, and exits, draining to the reservoir 128. The flow cycle of cooling system 122 is completed as motor coolant is drawn from reservoir 128 for cooling within second heat exchanger 146, and returned to pump 130 to be recycled. In an embodiment, heat absorbed by motor coolant is transferred to a circulating vehicle coolant stream by thermal contact within second heat exchanger 146 and is transported to first heat exchanger 120 to be dissipated to the atmosphere. In another embodiment, second heat exchanger 146 is configured to directly dissipate heat absorbed by motor coolant to the atmosphere. In yet another embodiment, second heat exchanger 146 may be configured to transfer heat using a combination of direct dissipation to the atmosphere, and transfer to first heat exchanger 120.

In an embodiment, the vehicle coolant may be a mixture of water and ethylene glycol and the motor coolant may be a composition that does not electrically interact with or degrade the components of the electric motor 106, such as a dielectric liquid coolant. In another embodiment, the dielectric liquid coolant may include mixtures of methylsiloxane and an organic compound such as polypropylene glycol methyl ether. In another embodiment, the dielectric liquid coolant may include mixtures of hexmethyldisiloxane and propylene glycol methyl ether, where the hexmethyidisiloxane has a percentage by weight greater than about 60%, and the propyleneglycol methyl ether has a percentage by weight in a range of about 10% to about 30%. As used herein, the term "about" means within 0.5%.

In another embodiment, the dielectric liquid coolant may comprise other compositions, including certain high molecular weight hydrocarbons, (HMWHs), silicone oils, and natural and synthetic esters. In general, coolant liquids typically have a low volatility to avoid excessive vaporization when subjected to elevated operating temperatures over long periods of time. Further, the coolant should have a sufficiently low viscosity over a range of operating temperatures to minimize frictional drag and facilitate flow through cooling veins and other small passages. Finally, coolant liquids chosen typically are chemically stable, having minimal reactivity in the presence of oxygen at operating temperatures, and are generally non-corrosive to any of the materials comprising the electric motor 106.

Figure 3:
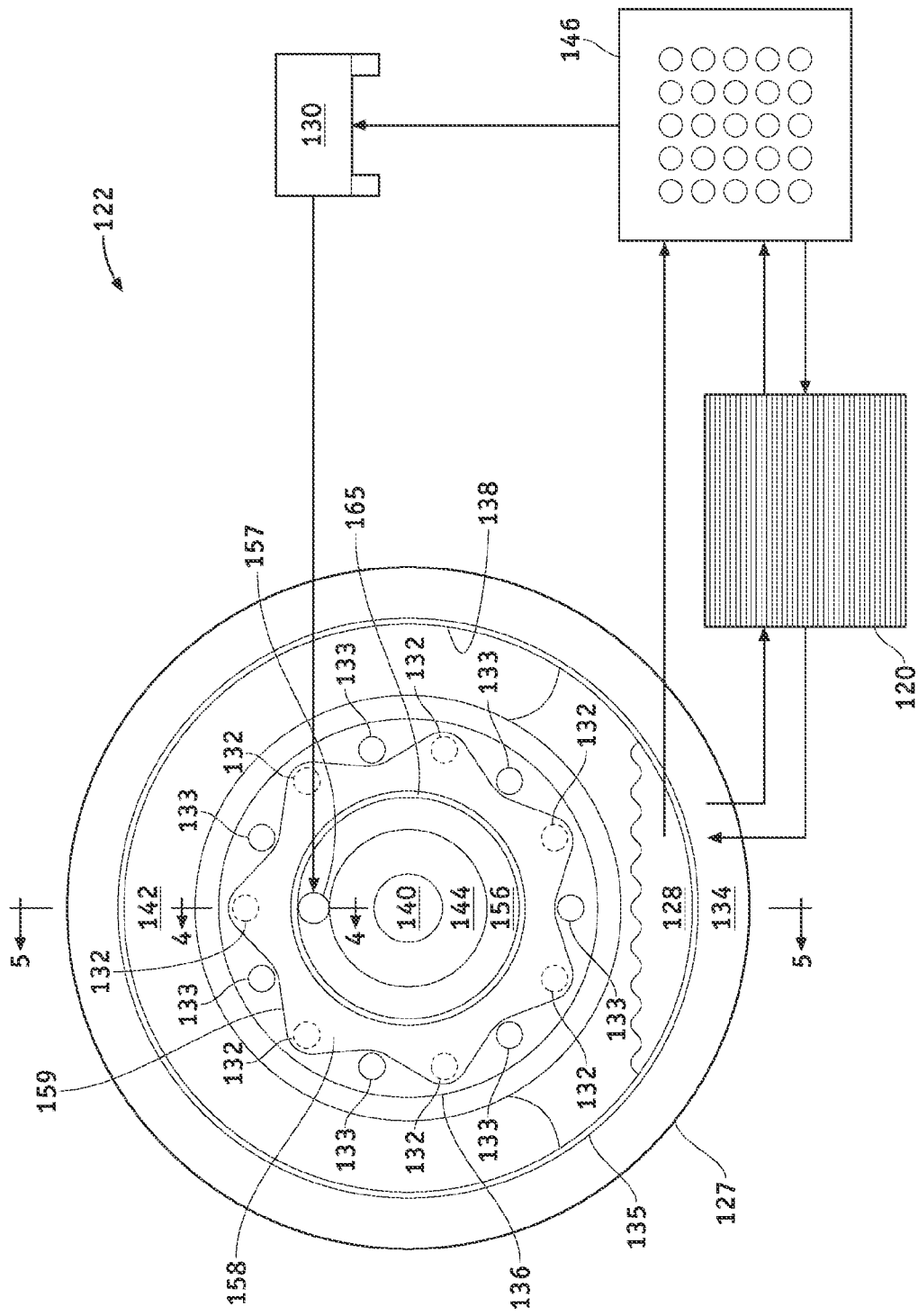
FIG. 3 is an end view of an electric motor cooling system in accordance with an embodiment.

FIG. 3 depicts several components of cooling system 122, including an end view of electric motor 106, in accord with a current embodiment. A cooling jacket 134 is in fluid communication with, and is thermally coupled to first heat exchanger 120, and may be disposed concentrically about, and in thermal communication with housing 138. Cooling jacket 134 is configured with an inner wall 135 and an outer wall 127 between which vehicle coolant from first heat exchanger 120 may flow. A stator 142 is thermally coupled to and is disposed within housing 138, and may transfer heat therethrough into vehicle coolant flowing within cooling jacket 134.

Rotor 136 is disposed concentrically within stator 142, and is coupled to and rotates on a shaft 140. Shaft 140 is supported by and rotates concentrically within a first bearing 144 and a second bearing 145 (FIG. 5) which are both coupled to housing 138. In an embodiment, rotor 136 has a first plurality of cooling veins 132 extending between its two ends and configured substantially parallel to its axis of rotation, for flowing motor coolant in substantially one direction therethrough. In another embodiment (further illustrated in FIG. 5 and described in detail below), rotor 136 has a second plurality of cooling veins 133 also extending between its two ends and configured substantially parallel to its center axis of rotation for flowing motor coolant in substantially the opposite direction. Each of the first plurality of cooling veins 132 has an inlet that receives fluid input from first manifold 158 and an outlet that drains to reservoir 128. First manifold 158 is coupled to and rotates with rotor 136, and has an inlet in fluid communication with a first intake assembly 156. The peripheral edge of first manifold 158 has a first rim 159 configured to provide a surface from which exiting motor coolant may be further distributed within housing 138 by the rotating action of rotor 136, and absorb additional heat thereby. A separation 165 between first intake assembly 156 and first manifold 158 exists allowing first manifold 158 to rotate adjacent the stationary first intake assembly 156, and may be sealed to prevent fluid passage as will be further explained below. The outlet of first manifold 158 combines in fluid communication each inlet to the first plurality of cooling veins 132. The first intake assembly 156 is coupled to first bearing 144, receives fluid input from pump 130 through a first intake port 157, and directs its fluid effluent to first manifold 158. Pump 130 receives fluid input from second heat exchanger 146 and directs an outflow to first intake assembly 156. Second heat exchanger 146 is thermally coupled to first heat exchanger 120, receives fluid input from reservoir 128, and directs a fluid effluent stream to pump 130.

Referring to FIG. 3, during system operation, pump 130 forces motor coolant through first intake assembly 156 and into rotating first manifold 158 wherein it is channeled into each inlet of the first plurality of cooling veins 132. These fluid streams absorb heat from rotor 136 while traversing therethrough, exit, and drain into reservoir 128. In an embodiment, heat may transfer from motor coolant residing in reservoir 128 through housing 138 and into cooling jacket 134 from where it is transported by circulating vehicle coolant to first heat exchanger 120. In another embodiment, motor coolant is drawn from reservoir 128 into second heat exchanger 146 wherein additional heat may transfer to vehicle coolant via thermal coupling therein. Motor coolant exiting from second heat exchanger 146 returns to pump 130 in a cooled state to be recycled through cooling system 122.

Figure 4:
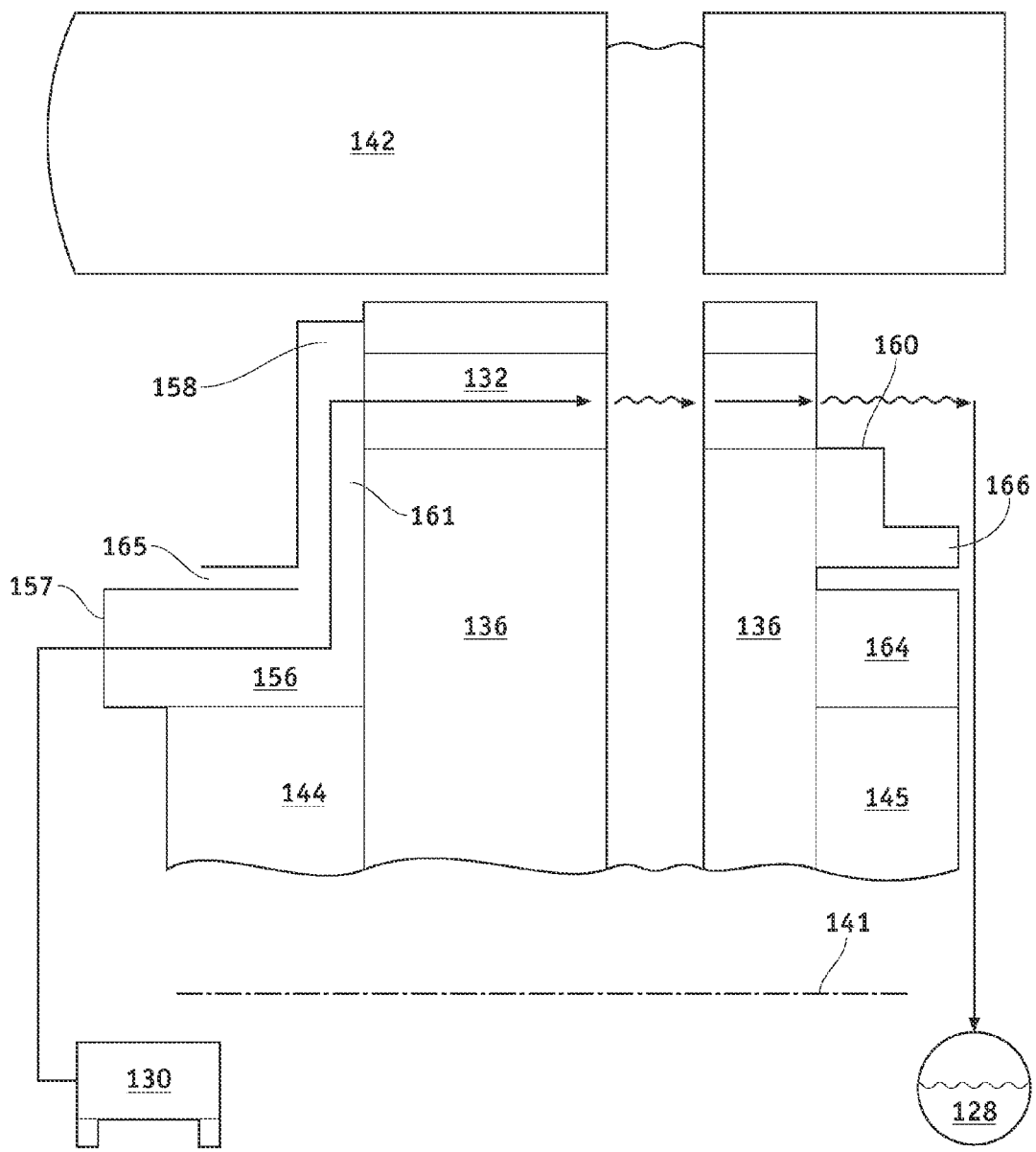
FIG. 4 is a schematic diagram of the intake/manifold region of the electric motor cooling system in accordance with the exemplary embodiment.

FIG. 4 illustrates a magnified schematic view of the flow pathway from pump 130 to reservoir 128. Certain features not in the cut plane of FIG. 4 (shown in FIG. 3) have been omitted for clarity. Referring to FIG. 4, motor coolant pressurized by pump 130 is directed through first intake port 157, into first intake assembly 156, and into first manifold 158 via a gap 161 as shown therebetween. This pressure, combined with the rotating action of first manifold 158 and rotor 136 about axis of rotation 141, causes motor coolant to advance through gap 161 and enter the inlets to each of the first plurality of veins 132. Those having skill in the art will appreciate that during system operation, the separation 165 between first intake 156 and first manifold 158 may allow a small amount of motor coolant to seep out of the intake/manifold assemblies prior to entering first plurality of veins 132. Alternatively, the separation 165 may be sealed using an appropriate seal, preventing such escape.

Motor coolant flows through first plurality of veins 132 to their outlets where it exits and drains to reservoir 128. Prior to reaching reservoir 128, exiting coolant may be distributed throughout the housing 138 by the rotating action of rotor 136 and absorb additional heat through contact with the surfaces of heated internal components disposed therein, such as the stator winding end turns. In another embodiment, second manifold 166 has a second peripheral rim 160 disposed adjacent to the outlets of the first plurality of veins 132. Second rim 160 is configured to complement the rotating action of rotor 136 by providing a surface from which motor coolant may be distributed onto other internal components including but not limited to the windings of stator 142, facilitating further cooling thereby. Effluents from cooling veins 132 including drainage from such components is collected in reservoir 128.

Figure 5:
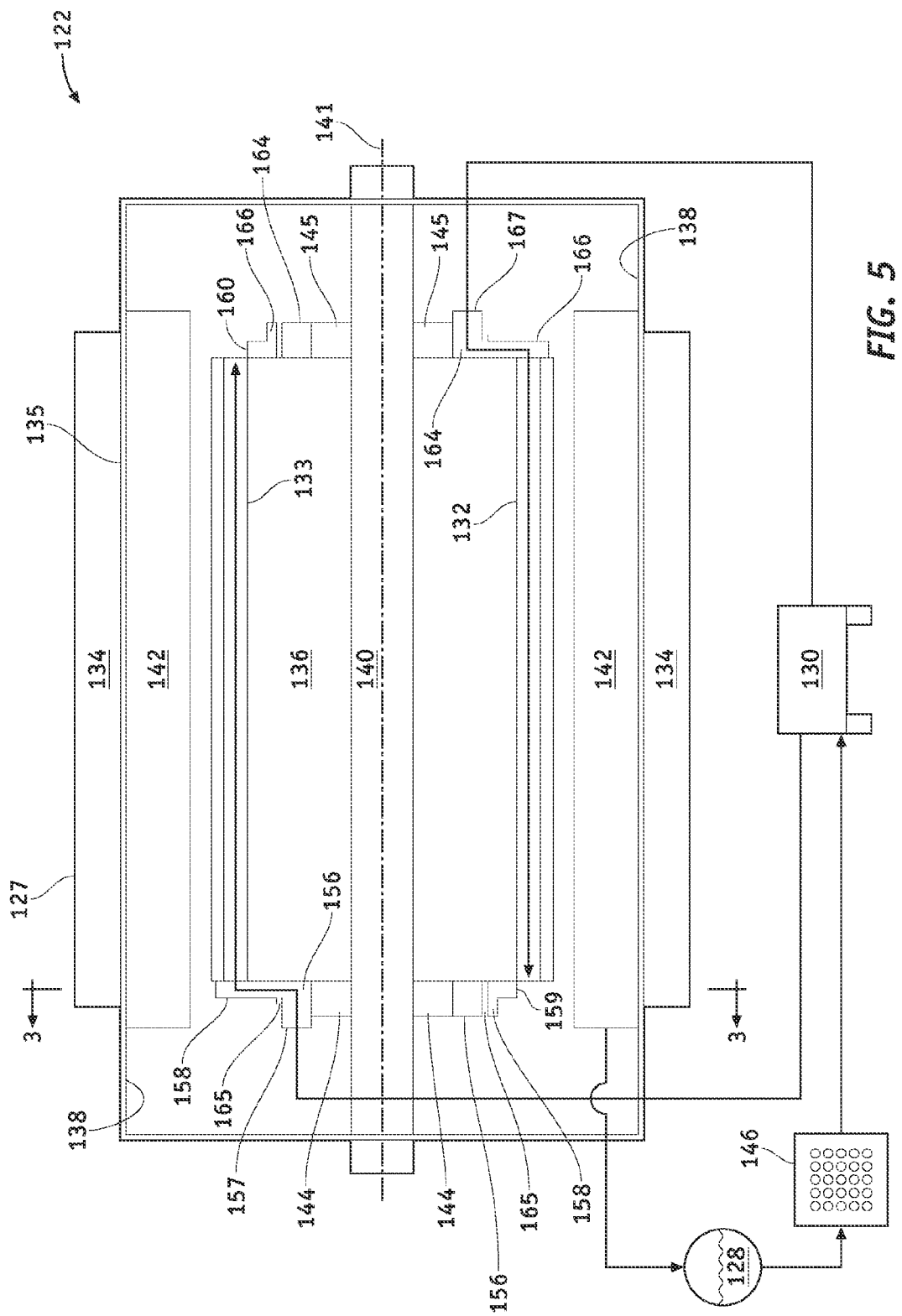
FIG. 5 is a cross-sectional side view of the electric motor cooling system in accordance with the exemplary embodiment.

FIG. 5 is a cross-sectional side view of cooling system 122 in accordance with another exemplary embodiment. Referring to FIG. 5, cooling system 122 is configured for bidirectional flow whereby motor coolant is directed into both ends of rotor 136 simultaneously, and coolant flows in substantially opposite directions within two separate sets of cooling veins. In this embodiment, rotor 136 has a first and second plurality of cooling veins, 132 and 133 respectively, extending between both of its ends, and oriented substantially parallel to the axis of rotation 141. The first manifold 158 is coupled to a first end of rotor 136 and guides fluid input into the first plurality of cooling veins 132. The second manifold 166 is coupled to the opposite end of rotor 136 and guides fluid input into the second plurality of cooling veins 133. Flow from both pluralities of cooling veins drains from their outlets into reservoir 128. The first intake assembly 156 and a second intake assembly 164 having a second intake port 167 are coupled to the first and second bearing 144 and 145 respectively, and remain stationary during operation. They direct fluid input to first and second manifolds 158 and 166 respectively, and receive fluid input from pump 130.

Referring again to FIG. 3, in another embodiment, cooling system 122 is configured for bidirectional flow wherein the first and second plurality of cooling veins, 132 and 133 respectively, are interleaved with each other. In this embodiment, first manifold 158 is configured to include only every other vein into a first plurality of veins 132. The second manifold 166, coupled to the opposite end of rotor 136, (shown in FIG. 5 only in cross-section) joins a second plurality of veins 133 comprised of only the remaining veins not included in the first plurality. In this manner, each vein is in fluid communication with only one manifold, and both pluralities of veins are interleaved with each other in an alternating pattern. Accordingly, both manifolds are configured to allow unobstructed passage of coolant exiting from the outlets to adjacent veins. Further, in an embodiment depicted in FIG. 3, the inlets to the first plurality of veins 132 and the outlets to the second plurality of veins 133 are positioned in an alternating pattern around the rotor and arranged in a substantially circular form. It should be understood however that many other vein positions and arrangements are possible and this invention should not be construed to limit the final arrangement to any particular design or geometry.

Referring to FIG. 5, during system operation, pump 130 forces motor coolant simultaneously through first and second intake assemblies 156 and 164, into first and second manifolds 158 and 166, and through the first and second pluralities of cooling veins 132 and 133 respectively. As shown by the arrows, flow through the first plurality of cooling veins 132 is directed substantially opposite to flow in the second plurality of cooling veins 133. Coolant exits from first and second vein sets 132 and 133 and a portion of this effluent flows over first and second rims 159 and 160 respectively. As previously described, rims 159 and 160 are each configured to provide a surface from which coolant may be further distributed within the housing by the rotating action of rotor 136. Finally, coolant drains to reservoir 128, and is drawn through second heat exchanger 146 wherein absorbed heat is removed prior to returning to pump 130 for recycling.

Those skilled in the art will appreciate the advantages of cooling a mass using bidirectional flow. Where unidirectional flow is used, cooling streams enter a mass at only one end. Flow is oriented in substantially one direction resulting in a lower overall cooling efficiency, and an asymmetric temperature profile in the mass. Where bidirectional flow is used, cooling streams are configured to enter a mass at substantially opposite ends, and flow in substantially opposite directions resulting in improved heat transfer efficiency, and a more symmetric final temperature profile. Additional improvements can be achieved by configuring bidirectional streams in an interleaved or alternating pattern as previously described and shown in FIG. 3. When arranged in this manner, each stream has two adjacent streams flowing in substantially the opposite direction. Such a design results in improved temperature uniformity and profile symmetry within the mass, and greater overall heat transfer.

While at least one exemplary embodiment has been presented in the foregoing detailed description, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing the exemplary embodiment or exemplary embodiments. It should be understood that various changes can be made in the function and arrangement of elements without departing from the scope of the invention as set forth in the appended claims and the legal equivalents thereof.

What is claimed is:

1. A system for providing a motor coolant to an electric motor having a housing, the system comprising:
 a rotor assembly coupled to and rotatable within the housing, the rotor assembly comprising:
  a rotor having a first end and a second end and having a first plurality of veins extending therebetween, each of the first plurality of veins having an inlet and an outlet; and
  a first manifold coupled to and rotatable with the first end of the rotor, the first manifold in fluid communication with the inlets of the first plurality of veins;
 an intake assembly fixedly disposed within the housing adjacent the first manifold, in fluid communication with the first manifold, and spaced apart from the first manifold by a separation to allow the intake assembly to remain stationary while the first manifold rotates in conjunction with the rotor; and
 a first reservoir configured to contain the motor coolant and coupled to the housing for collecting the motor coolant from the outlets of the first plurality of veins, and for providing a source of motor coolant to the intake assembly.

2. The system of claim 1, further comprising a pump coupled to the housing and in fluid communication with the first reservoir and the intake assembly, for transferring motor coolant from the first reservoir to the intake assembly.

3. The system of claim 2, wherein the pump is a sump pump.

4. The system of claim 1, further comprising a first heat exchanger thermally coupled to and in fluid communication with the first reservoir and configured to remove heat from the motor coolant.

5. The system of claim 4, wherein the first heat exchanger is an air-cooled heat exchanger.

6. The system of claim 4 further comprising a second heat exchanger configured to conduct a vehicle coolant, the second heat exchanger thermally coupled to and in flow communication with the first heat exchanger for transferring heat from the motor coolant to the vehicle coolant.

7. The system of claim 1 wherein the first reservoir is disposed within and thermally coupled to the housing, and further comprising:
 a cooling jacket disposed about and thermally coupled to the housing; and
 a second heat exchanger configured to conduct a vehicle coolant, the second heat exchanger thermally coupled to and in flow communication with the cooling jacket, wherein motor coolant contained in the first reservoir and vehicle coolant flowing in the cooling jacket are thermally coupled, and wherein heat is transferred from the motor coolant to the vehicle coolant.

8. The system of claim 1, wherein the rotor is configured to distribute motor coolant exiting from the outlets of the first plurality of veins within the housing.

9. The system of claim 8, wherein the electric motor further comprises a stator having windings disposed within the housing, and wherein motor coolant exiting from the outlets of the first plurality of veins is distributed to the windings of the stator.

10. The system of claim 1, further comprising:
 a second plurality of veins extending between the first end and the second end of the rotor, each of the second plurality of veins having an inlet and an outlet;
 a second manifold coupled to and rotatable with the second end of the rotor, the second manifold in fluid communication with the inlets to the second plurality of veins; and
 a second intake assembly, coupled to the housing, and in fluid communication with the second manifold and the first reservoir.

11. The system of claim 10, wherein the first and second pluralities of veins are positioned in an alternating pattern around the rotor.

12. The system of claim 10, wherein at least one of the first and second manifolds has a rim configured to increase the distribution of the motor coolant within the housing.

13. A system for cooling an electric motor having a housing, the system comprising:
 a rotor assembly mounted to and rotatable within the housing, the rotor assembly comprising:
  a rotor having first and second ends and having a first and second plurality of veins extending therebetween, each vein from the first and second plurality of veins having an inlet and an outlet;
  a first manifold coupled to and rotatable with the first end of the rotor and in fluid communication with the inlets to the first plurality of veins; and
  a second manifold coupled to and rotatable with the second end of the rotor and in fluid communication with the inlets to the second plurality of veins;
 an intake assembly in fluid communication with the first and second manifolds; and
 a first reservoir configured to contain a motor coolant, the first reservoir coupled to the housing and in fluid communication with the outlets of each vein of the first and second plurality of veins for collection of the motor coolant, and with the intake assembly for providing a source of motor coolant thereto;
 wherein the first manifold includes an outer peripheral rim, and wherein each of the outlets of the second plurality of veins is positioned substantially adjacent to and radially outward of the outer peripheral rim to direct motor coolant over the outer peripheral rim during rotation of the rotor assembly.

14. The system of claim 13, further comprising a first heat exchanger thermally coupled to and in fluid communication with the first reservoir and configured to remove heat from the motor coolant.

15. The system of claim 14, wherein the first heat exchanger is an air-cooled heat exchanger.

16. The system of claim 14 further comprising a second heat exchanger configured to conduct a vehicle coolant, the second heat exchanger thermally coupled to and in flow communication with the first heat exchanger for transferring heat from the motor coolant to the vehicle coolant.

17. The system of claim 13 wherein the first reservoir is disposed within and thermally coupled to the housing, further comprising:
 a cooling jacket disposed about and thermally coupled to the housing; and
 a second heat exchanger configured to conduct a vehicle coolant, the second heat exchanger thermally coupled to and in flow communication with the cooling jacket, wherein motor coolant contained in the first reservoir and vehicle coolant flowing in the cooling jacket are thermally coupled, and wherein heat is transferred from the motor coolant to the vehicle coolant.

18. The system of claim 13, wherein the direction of flow of motor coolant in the first and second plurality of veins is configured to be substantially opposite.

19. The system of claim 13, wherein the first and second pluralities of veins are configured to be interleaved with each other such that their inlets and outlets form an alternating pattern.

20. A method for providing motor coolant to an electric motor, the electric motor including a housing, a cooling jacket disposed around the housing, and a rotor rotatably mounted in the housing and having a plurality of veins extending therethrough, each vein having an inlet and an outlet, the method comprising the steps of:
  pumping the motor coolant through the plurality of veins;
  collecting the motor coolant exiting from the outlets of the plurality of veins in a fluid reservoir;
  circulating a vehicle coolant through the cooling jacket and a first heat exchanger to cool the electric motor;
  transferring heat from the motor coolant to the vehicle coolant in a second heat exchanger; and
  removing heat from the vehicle coolant in the first heat exchanger.

* * * * *